United States Patent [19]
Jubenville, deceased et al.

[11] 3,886,339
[45] May 27, 1975

[54] SENSING DEVICE FOR AUTOMATIC BRAKE SYSTEM INCLUDING INERTIA SWITCH WITH MAGNETIC HOLDING MEANS

[76] Inventors: Arthur R. Jubenville, deceased, late of 20 Grist Mill Ln., Halesite, N.Y.; by Irene L. Jubenville, administratrix, 20 Grist Mill Ln., Halesite, N.Y. 11743

[22] Filed: Dec. 26, 1973

[21] Appl. No.: 427,501

[52] U.S. Cl............ 200/61.45 M; 340/262; 180/103
[51] Int. Cl..................... H01h 35/02; H01h 7/20
[58] Field of Search.................. 200/61.45 R, 61.53; 340/262; 180/103, 104

[56] References Cited
UNITED STATES PATENTS

| | | | |
|---|---|---|---|
| 2,942,456 | 6/1960 | Hardway, Jr. | 200/61.45 M X |
| 3,448,228 | 6/1969 | Munroe | 200/61.45 M UX |
| 3,784,773 | 1/1974 | Jubenville | 200/61.45 M |
| 3,794,786 | 2/1974 | Doyle | 200/61.45 M X |

Primary Examiner—James R. Scott
Attorney, Agent, or Firm—Richard L. Miller

[57] ABSTRACT

The invention describes an acceleration sensing device for use with an automatic brake system in vehicles having a towed portion and a towing portion. The sensing device includes a steel ball which in response to lateral acceleration of the towed vehicle can roll from a resting position onto either of two levers extending from the rest position. The levers have a first section which includes an upwardly inclined concave curved shape interconnected to a double pole switch. As the ball moves onto the curved section in response to a limited acceleration the lever end moves downward closing the switch onto a first position producing a warning signal. As the ball moves further along the curved section in response to an excessive acceleration the lever end moves upward closing the switch onto a second position producing a brake signal. The platform retaining the ball in a rest position can be adjusted to bias the ball. Adjustable magnetic apparatus holding the ball in its rest position provides additional biasing. Dampers are included to bias the ball as it rolls along the levers.

30 Claims, 19 Drawing Figures

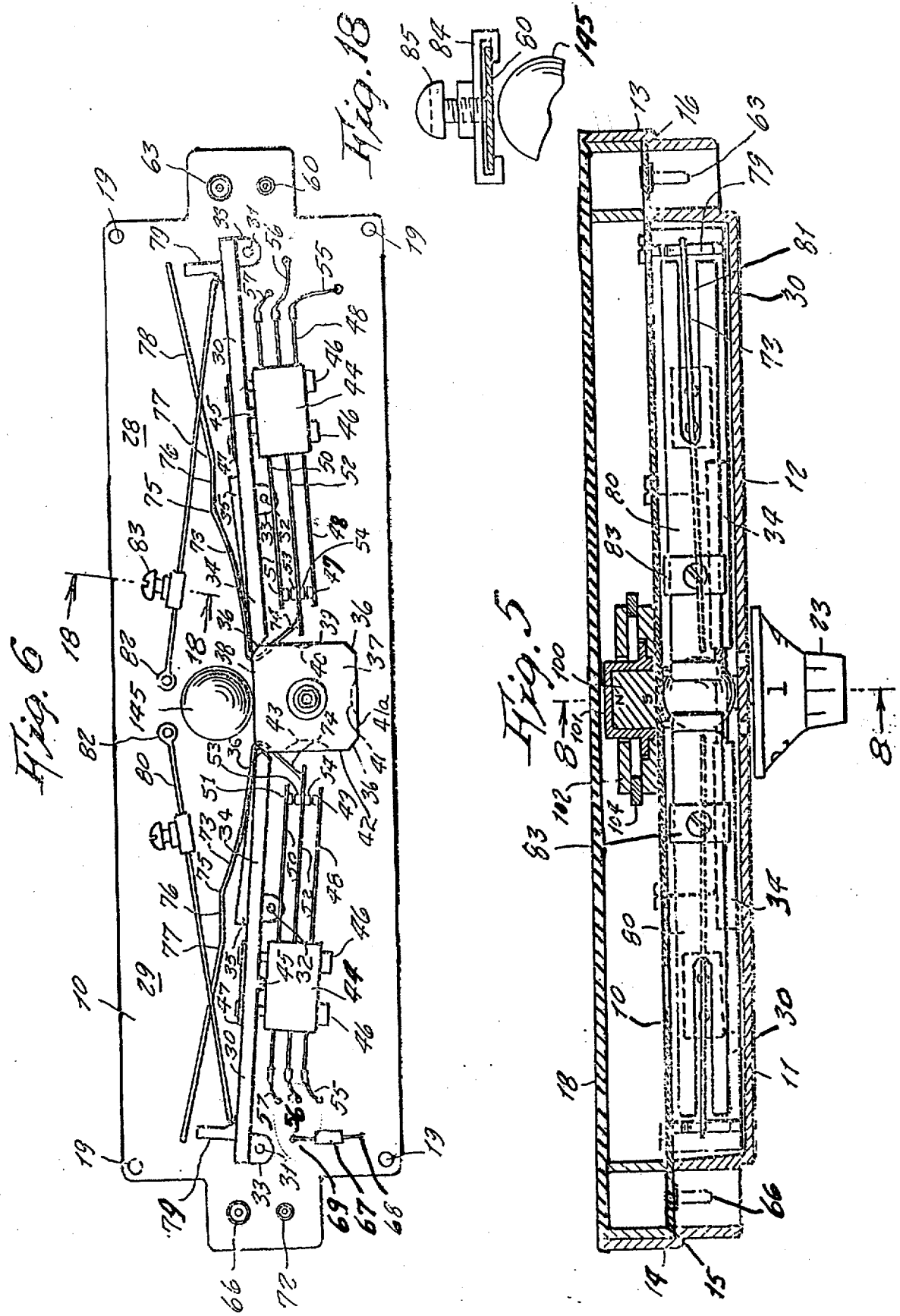

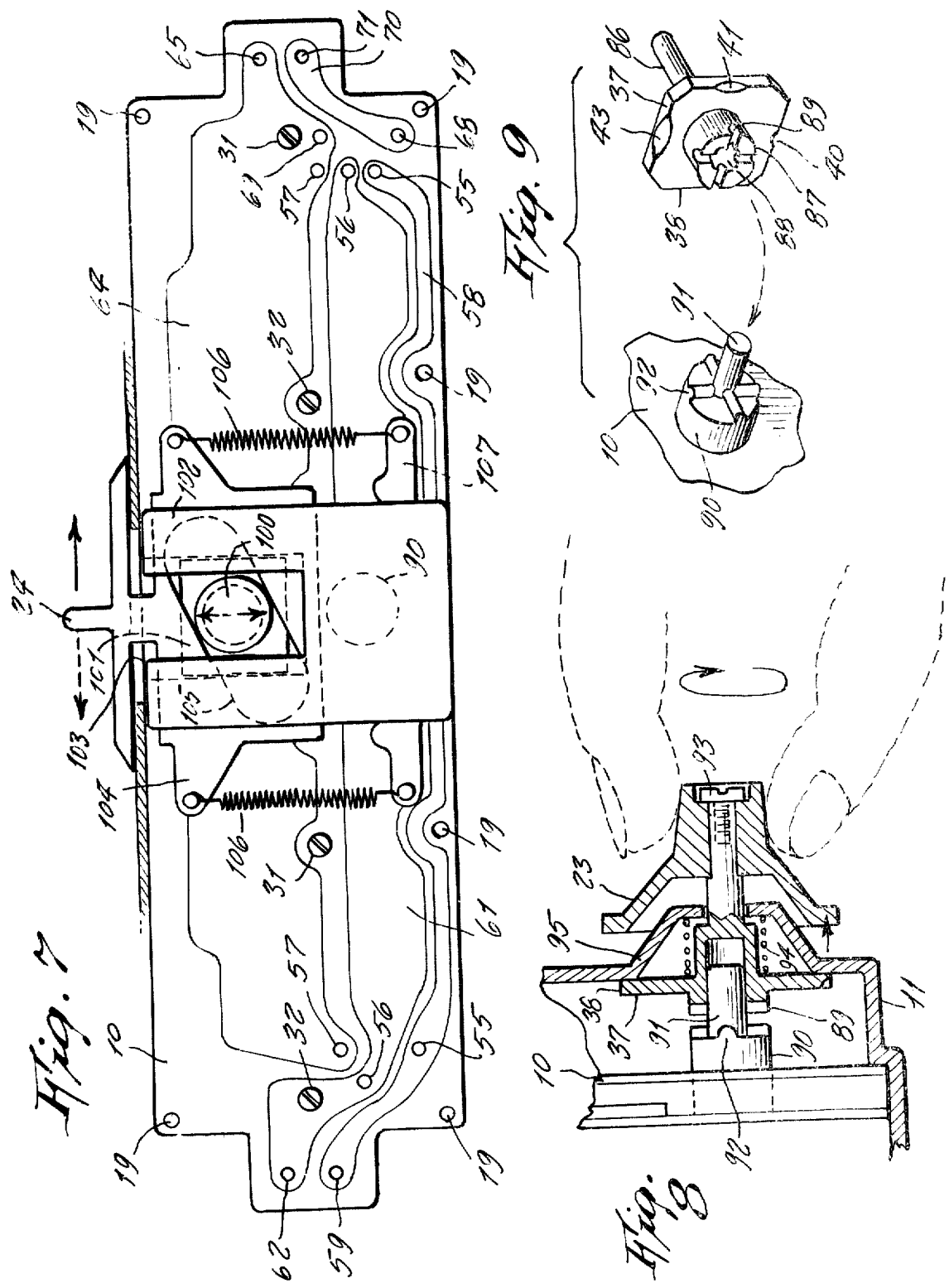

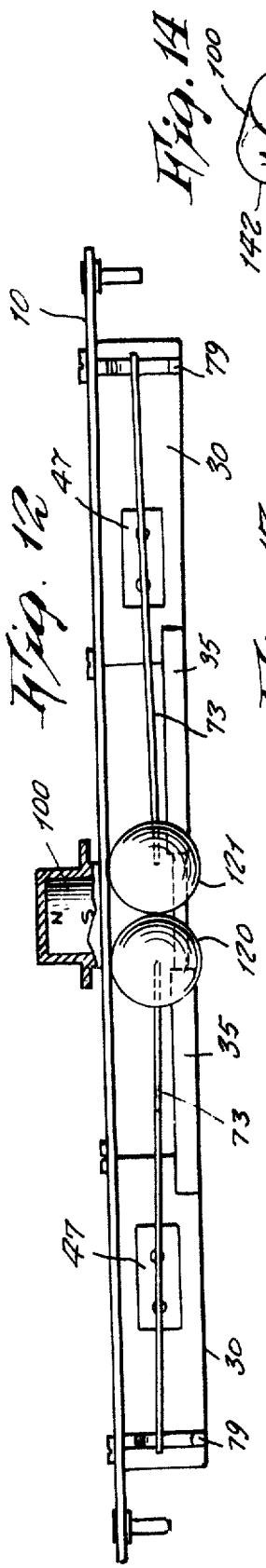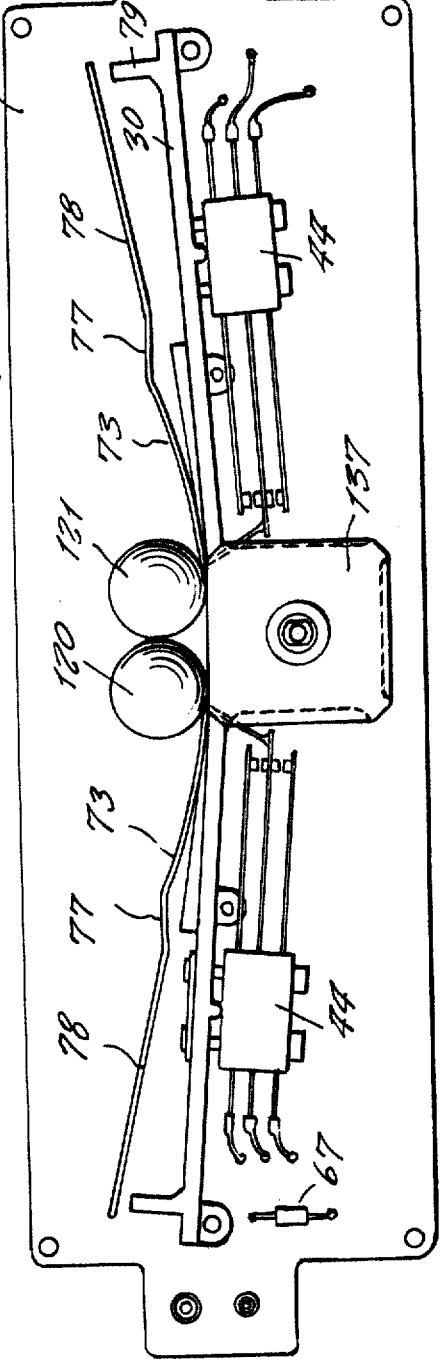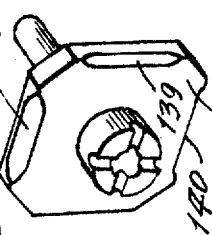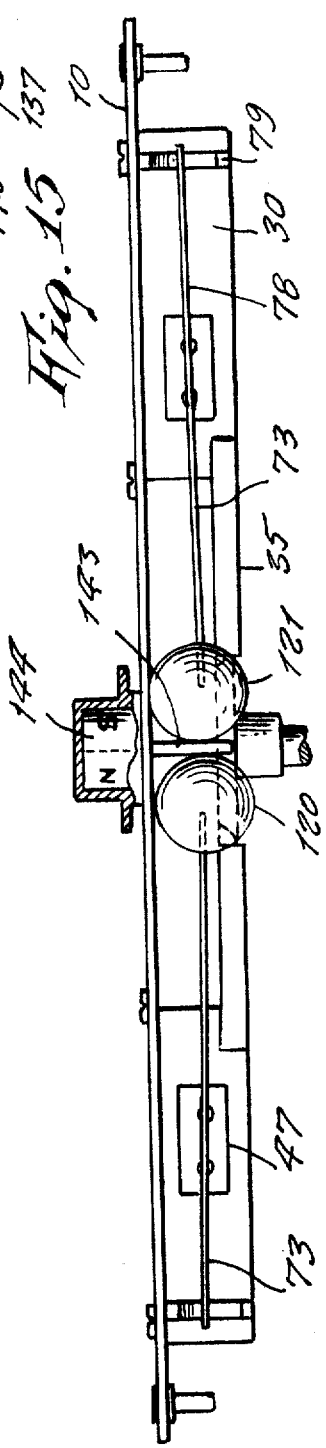

SENSING DEVICE FOR AUTOMATIC BRAKE SYSTEM INCLUDING INERTIA SWITCH WITH MAGNETIC HOLDING MEANS

BACKGROUND OF THE INVENTION

One of the greatest problems in using a towed vehicle of the trailer type is that such vehicle, when subjected to a lateral force, tends to oscillate or fishtail and with sufficient force may skid and cause a jackknifing condition. The situation is further aggravated with increase in size of the trailer and/or the speed at which the trailer is being towed. With improved highway conditions permitting the use of trailers at increased speeds, the excessive oscillations of the trailer create the possibility of accidents involving both the trailer as well as other vehicles on the highway.

It has been found that one method of controlling the towed vehicle is to apply the brakes in such a manner that the brakes of the trailer portion be applied before the brakes of the towing portion. In the conventional trailer type vehicle the brakes of the trailer portion are connected to the brake system of the towing car so that upon application of the brakes in the towing car, the trailer brakes will also be applied. The brakes are so connected, such that the trailer brakes are usually applied before the car brakes.

While in theory this application of the braking force to the trailer portion should be sufficient to correct the oscillation, in practice this method does not always produce the desired results. There is usually a relatively great time delay before the operator of the vehicle can respond to the emergency and apply the brakes properly. This delay in applying the brakes can in fact further aggravate the fishtailing of the trailer. As the weight of the trailer portion shifts from one side to the opposite side unequally, the extra loaded on one side, coupled with the delayed braking may cause an unequal application of the braking action which may in fact increase the oscillation to such an extent that the operator loses control of the trailer entirely.

In some situations it may not even be necessary to apply braking action. Merely reducing the speed of the vehicle may be sufficient to reduce fishtailing of the trailer and bring the trailer portion in line with the towing vehicle. Thus, with a minimum amount of oscillation of the trailer portion it would suffice to provide a warning signal to the driver of the vehicle to have him slow down the vehicle in order to bring the trailer portion in line. Should excessive oscillations occur, then the warning would not be enough and, to eliminate the possibility of an accident, it would be necessary to provide automatic braking action to the trailer.

The preferred method of correcting excessive oscillations or fishtailing of the trailer portion is to provide the braking action as soon as the situation becomes dangerous, and furthermore, to apply such braking action only to the trailer brakes. Various control systems are presently available which apply braking action on the trailer portion independently of the towing car. Two such anti-fishtail control systems are described in U.S. Pat. No. 3,784,773 entitled TRAILER ANTI-FISHTAIL ACCELERATION RESPONSIVE SWITCH ASSEMBLY WITH ACTUATOR MAGNETIC HOLDING STRUCTURE and No. 3,840,276 entitled CONTROL CIRCUIT FOR AUTOMATIC BRAKE SYSTEM by the inventor of the present application. In that system, a control circuit is provided which includes a warning lamp which turns on upon receiving a warning condition at the occurrence of limited oscillations and selective braking action is applied to the trailer brakes upon receiving a further signal indicating excessive oscillations of the trailer portion.

In addition to the control circuit which provides the necessary electrical interconnections to the vehicle, it is necessary to have a sensing device which can detect the oscillations of the trialer portion and produce both a warning output and a braking output. One such sensing device is described in U.S. Pat. No. 3,715,003 issued on Feb. 6, 1973 to the inventor of the present application. In that patent an acceleration sensing unit is located on the rear portion of a trailer which detects oscillations of the trailer to provide a warning signal when limited oscillations occur and to provide a brake signal when excessive oscillations occur. The device includes a ferromagnetic ball which can move along either of two inclined branches extending on either side of a rest position. Magnetic apparatus is provided for adjustably biasing the ball to hold it in its rest position.

When the sensing device described in the aforementioned patent does provide the necessary warning signal and brake signal, the sensing device is rather bulky and complex to use. Numerous adjustments are necessary prior to having the unit operate properly in any particular trailer. In addition, the inclined branches include a lever with a fulcrum which spaces the lever from the inclined branch. The movement of the lever as the ferromagnetic ball traverses along it causes the lever to close onto either of two contacts of an electrical switch. Because of the fulcrum arrangement, the sensitivity and accuracy of the lever is not very great and it is possible for the ferromagnetic ball to traverse the lever without actuating the switch. Furthermore, in the sensing device of the aforementioned U.S. Pat. No. 3,715,003 a trap is provided at the end of the lever path to provide adjustment of the time during which the brakes are applied. As the ball traverses along the lever to its outer limit, the ball becomes trapped and remains there continuously producing a brake signal until such time as the ball is released by means of a release mechanism. Thus, when using the sensing device of the aforementioned patent, it is necessary to reset the sensing device regularly during the course of normal use. Yet another problem with the aforediscussed device is that the adjustable biasing means described for retaining the ball in its rest position includes two magnetic devices each of which can be regulated independently as needed. Because two magnets are used it is possible that the magnetic force between the two magnets interract thereby improperly biasing the ball.

It is therefore an object of this invention to provide a sensing device for an anti-fishtail control system which avoids the aforementioned problems of the prior art.

A further object of this invention is to provide a sensing device for a trailer brake system which detects oscillations of the trailer portion in a vehicle having a towing car and towed trailer.

Another object of this invention is to provide a sensing device for an anti-fishtail control system which can be installed in the rear portion of the towing vehicle and nevertheless detect oscillations in the towed vehicle.

A further object of this invention is to provide a sensing device for a brake system which provides a warning signal upon detecting limited oscillations of the trailer portion and which provides a brake signal upon detecting excessive oscillations of the trailer portion.

Yet another object of this invention is to provide a sensing device for a trailer brake system which can be easily installed in the towing car.

Another object of this invention is to provide a sensing device for a trailer brake system which permits easy sensitivity control of the warning and brake signals.

Still a further object of this invention is to provide a sensing device for an automatic trailer brake system which is small, accurate and sensitive to oscillations of the trailer portion.

These and other objects, features and advantages of the invention will, in part, be pointed out with particularity, and will, in part, become obvious from the following more detailed description of the invention taken in conjunction with the accompanying drawings which form an integral part thereof.

SUMMARY OF THE INVENTION

Briefly, this invention provides a sensing device for use with a control circuit in a vehicle brake system for a vehicle having a towed portion such as a trailer. The sensing device functions as a displacement sensor in fishtailing and/or over control situations. The sensor is installed in the rearward portion of the towing car horizontally, transverse to the direction of motion of the vehicle. When abnormal trailer behavior develops, the oscillating forces are transmitted to the towing vehicle body through the interconnecting hitch. A ferromagnetic ball is contained in the sensor which normally rests on an adjustable platform. The platform contains a number of recesses which can be adjustably positioned under the ball to retain it in its rest position. Magnetic means are positioned adjacent to the ball and slidably adjustable relative thereto, to provide biasing of the ball in its rest position. Two inclined levers are provided on either side of the rest position. The levers include a first section having an upwardly inclined concave curved shape, a middle section substantially horizontal and a linearly inclined third section. The lower end of the first curved section is connected to a two position switch.

Lateral acceleration of the trailer portion transmitted through the interconnecting hitch to the towing vehicle causes displacement of the ball from its rest position along either of the two levers. The curved first section of the lever operates similar to the bottom portion of a rocking chair, such that as the rolling ball traverses the initial portion of the curve, the lever is lowered thereby closing the switch onto a first contact thereby providing a warning signal. As the ball traverses further along the curved portion, the front end of the lever will move upward thereby closing the switch onto its second contact to provide a brake signal. With sufficient lateral acceleration the ball will continue along the horizontal section of the lever to gain momentum to negotiate the linear third section of the lever. The angular inclination as well as the length of the third section determines the duration of the brake signal. The sensing device is constructed on a single printed circuit board with the mechanical and electrical components on either side of it. The printed circuit board is contained within an outer casing having externally available knobs and levers for biasing adjustment.

BRIEF DESCRIPTION OF THE DRAWINGS

FIG. 5 is a cross-sectional plan view of the sensing device taken along line 5—5 of FIG. 1.

FIG. 6 is a front elevational view of the sensing device with the casing removed and showing essentially one side of the printed circuit board.

FIG. 7 is a rear elevational view of the sensing device with the rear casing removed and showing essentially the rear side of the printed circuit board.

FIG. 8 is a fragmentary sectional view showing the adjustable knob biasing means and taken along line 8—8 of FIG. 5.

FIG. 9 is an exploded isometric view of the platform and lock mechanism.

FIG. 12 is a plan view of the printed circuit board showing a modification of the sensing device of the present invention.

FIG. 13 is a front elevational view of the circuit board showing the modification of the sensing device as shown in FIG. 12.

FIG. 14 is an isometric view of the magnet biasing means.

FIG. 15 is a plan view of the printed circuit board showing yet a further modification of the present invention.

FIG. 16 is an isometric view of the magnet biasing means used in FIG. 15.

FIG. 17 is an isometric view of the platform used in the embodiment shown in FIG. 13.

FIG. 18 is a fragmentary sectional view of the adjustable weight on the dampner and is taken along line 18—18 of FIG. 6.

DESCRIPTION OF THE PREFERRED EMBODIMENTS

Figure 1:
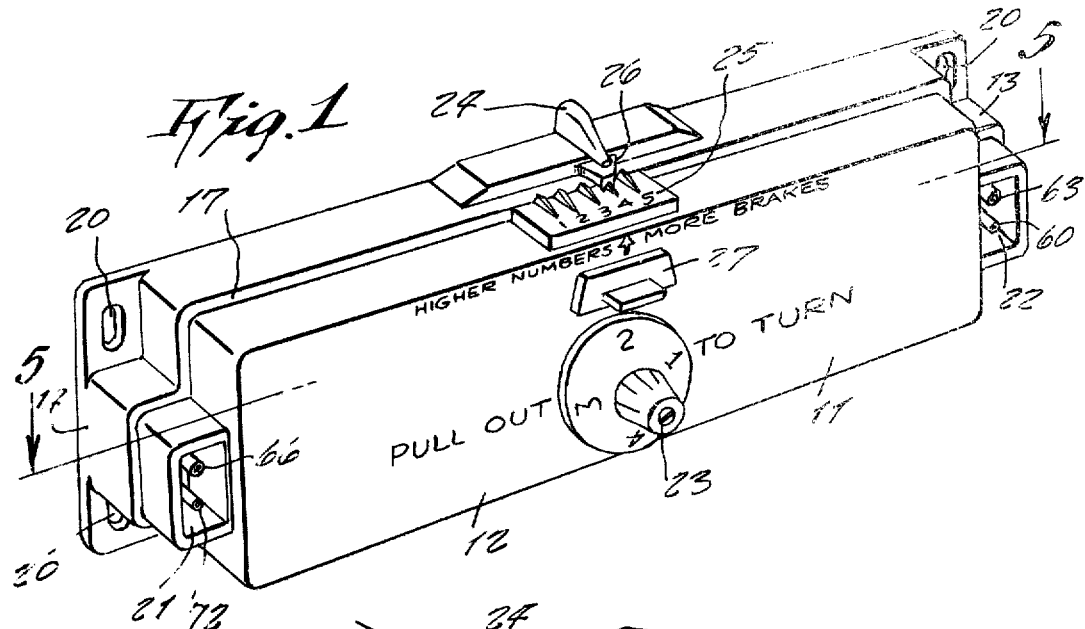
FIG. 1 is an isometric view of the sensing device showing its outer casing.

Referring to FIGS. 1–8, a preferred embodiment of the invention will now be described which can be installed in the rear portion of a towing vehicle having a trailer towed from a hitch connected to the back of the towing vehicle. The sensing device comprises a printed circuit board 10 securely mounted within a casing 11 which includes a front portion 12 and two sides portion 13, 14. The printed circuit board 10 snugly fits into the casing 11 and alots shoulder portions 15, 16 which are formed by the grooved section 17 in the outer case construction. The printed circuit board 10 is held in place by a back wall portion of the sensor case 18 by means of screws which pass from the outside of the case through the back case wall 18, through screw holes 19 in the corners of the printed circuit board, and into holes in the front section case 11.

The sensor case 11 includes adjusting slots 20 through which the sensing device can be mounted onto the vehicle and adjusted to be in the proper position. Cable terminals 21 and 22 are located at the sides of the sensor case to permit connection thereto of the appropriate electrical connections of the brake control system of which the present sensing device can be a part.

Two control devices are available for adjustment of the response of the sensor to oscillations in the trailer. A knob control 23 is provided with numerals indicating the various portions in which it can be set. The knob is pulled out and turned to adjust it. A slide 24 is also provided on the top portion of the sensor case with a slide index plate 25 containing numbered ridges. The slide 24 contains a grooved front lip 26 which can be lifted up and slid over the index plate and hooked onto one of the numbered ridges. A legend on the sensor case indicates that the higher numbers provide more brakes and therefore less biasing, as will hereafter be explained. A ball lock 27 is provided which is located on the front of the sensor case directly above the control knob. Within the sensor is a ferromagnetic ball such as a steel ball 145 which is activated by gravity and centrifugal force as will hereafter be described. The ball lock 27 has two pegs which are inserted through the case to keep the ball trapped during handling and shipment. The ball lock 27 should be removed and the two holes covered with a dustproof cover during operation. The ball lock can be retained and reinserted to deactivate the sensor when desired.

As is most clearly seen in FIGS. 5 and 6 the sensing device comprises right and left ramp assemblies shown generally as 28 and 29. The two ramp assemblies are identically constructed and therefore only ramp assembly 28 will now be described in detail herein. It is to be understood however, that ramp assembly 29 is made up of identical parts, which are indicated by the same reference characters in the drawings. Ramp assembly 28 comprises an elongated ramp member 30 secured onto a first side of the printed circuit board 10 by means of retaining screws 31, 32 which pass through tab portions 33 extending downward from the ramp member 30. The ramp retaining screw heads 31, 32 can be seen on the rear side of the printed circuit board in FIG. 7. The front section 34 of the ramp member 30 is cantilevered from the ramp member 30 and is spaced from the printed circuit board 10. An additionally inclined section 35 is located on top of the cantilevered section 34 on the front part of the ramp member 30. The front tip of the cantilevered section 34 is slanted to engage notched portions 36 of a platform 37 on which there rests a steel ball 145 in its normally resting position. The platform 37 is approximately square shaped with a first side 38 which is substantially flat; second side 39 with a slight groove 40 contained therein; a third side 41a with a deeper groove 41, and a fourth side 42 which contains a still deeper groove 43. As will be explained hereinafter, the platform can be rotated to each of four positions wherein one of the four sides are located beneath the steel ball such that in its rest position the steel ball can either lie on the flat surface 38 or on successively deeper grooves 40, 41, 43.

Beneath the ramp member 30 is located a switch block 44 which is spaced from the ramp member 30 by means of the fulcrum lip 45 extending beneath the ramp member 30. The switch block 44 is secured to the ramp member 30 by means of switch retaining and adjusting screws 46 which pass through the ramp member 30 into the switch retaining plate 47. Extending in cantilevered fashion from one end of the switch block 44 is a lower switch leaf 48 ending in a lower contact 49 and an upper switch leaf 50 ending in an upper contact 51. A further cantilevered switch leaf 52 extends between the upper and lower switch leaves and serves as a resilient pole. The pole 52 ends in upper and lower contacts 53, 54. The center pole 52 extends further outward than the upper and lower switch leaves 48, 50. The center pole 52 is resilient such that when moved downward it can complete a circuit path by closing contact 54 onto contact 49, and when moved upward it completes a circuit by closing contact 53 onto contact 51.

Switch leaf 48 extends through the switch block 44 to interconnect with terminal 55. In a similar fashion the center pole 52 continues on through the switch block 44 to interconnect to terminal 56, and the upper switch leaf 50 continues through the switch block 44 to interconnect to terminal 57. The ends of the terminals 55, 56, 57 pass through holes in the printed circuit board to connect to printed contact areas on the rear portion of the printed circuit board, which can best be seen in FIG. 7. The end of terminal 55 on the rear side of the printed circuit board 10 is electrically connected to the printed contact area 58. The contact area 58 is large enough to contact with both terminals 55 from the right and the left ramp assemblies and connects to an outlet terminal 59 which on the front side of the printed circuit board contacts a terminal pin 60. In a similar manner the ends of the center pole 52 which terminate in terminals 56 are interconnected on the reverse side of the printed circuit board to the printed contact area 61 which terminates in the outlet terminal 62 corresponding to terminal pin 72 on the front side of the printed circuit board. The upper switch leaves 50 which end in the contact 57 interconnect to the contact area 64 on the reverse of the printed circuit board 10 which ends in the outlet terminal 65 corresponding to the terminal pin 66 on the front of the printed circuit board. A diode 67 is connected on the front of the printed circuit board 10 which ends in terminals 68 and 69 passing through to the opposite side of the printed circuit board. The terminal 68 is interconnected by means of the contact area 70 to the outlet terminal 71 which corresponds with the terminal pin 72 on the front side of the printed circuit board. The terminal 69 is interconnected onto the contact area 64 to which the upper switch leaves 50 are connected.

Referring back to FIGS. 5 and 6 it will be seen that a control bar lever 73 is positioned adjacent to and above the ramp member 30. The lower end of the lever 73 is extended downward and away from the center of the sensor 74 to form an acute angled edge. The end 74 pass through the space between the cantilevered lever section 34 and the printed circuit board 10 and is attached to the resilient center pole 52. From the section 74 the lever arm 73 continues in an upwardly inclined concave curved shape until the point of inflection 75 at which point the lever continues in approximately horizontal position 76 until the point of inflection 77 at which the lever turns upward in a linear incline 78 until it reaches adjacent the edge of the printed circuit board. At the upper end of the ramp member 30 is located an upwardly extending V-shaped yoke member 79 which permits the end of the lever 78 to pass therein when the lever is depressed downward.

The operation of the device is as follows. When an oscillation of the towed vehicle occurs, the motion is transmitted to the rear section of the towing vehicle through the interconnecting hitch between the towed and the towing vehicles. The oscillation in essence causes the towing vehicle and sensor, which is connected thereto, to move out from under the steel ball. Effectively, the result is that the ball is caused to leave its rest position on the platform 37 to roll along either the right or the left lever 73. The weight of the ball depresses the lever 73. As the ball rolls onto the lever it first comes into contact with the lower portion of the concave curved section. The weight of the ball on the initial portion of the curve will cause the lever to be depressed which will cause the lever extension 74 to push the resilient arm 52 downward closing contact 54 onto contact 49. This will produce a warning signal as will be described more fully herein below. Continued movement of the ball along the lever 73 causes the ball to engage the upper portion of the concave curved section 73. The weight of the steel ball as well as the force towards the side caused by the acceleration of the steel ball along the lever path will depress the upper portion of the concave curved section downward and slightly towards the right causing the extension 74 to move upward thereby causing the resilient arm 52 to move upward and close contact 53 onto contact 51. This produces a brake signal as will hereinafter be explained. The action of the concave section can be understood when compared to the bottom of a rocking chair. When the chair is tipped forward the front end curve is lowered. When the chair is tipped backward with a force pressing downward and rearward the front curve will be lifted upward. In a similar manner, as the steel ball initially moves on to the curved section of the lever it first causes the lever to move downward. As the steel ball continues its movement along the lever towards the upper part of the curved section, it causes the front to move upward.

Continued movement of the ball causes it to traverse the horizontal section 76 which permits the ball to gain momentum to negotiate the inclined section 78. During the time that the ball is in contact with the horizontal section 76 and the inclined section 78, the lever extension 74 remains upward such that the contact 53 will remain closed onto contact 51 thereby continuously applying the brake force. The angle at the point of inclination 77 as well as the length of the section 78 will determine the duration of the time during which the brake signal is applied.

Referring again to FIGS. 5 and 6 there will be seen that dampers 80 are pivotly connected near the ends 36 of the ramp member 30. The end of the damper 80 adjacent to the pivotal connection is formed with a slotted section 81 to permit passage therethrough of the upper part of the lever 78. The upper end of the damper 80 ends in a damper pivot pin 82. Located along the damper 80 is an adjustable weight 83.

Referring to FIG. 18 it is seen that the adjustable weight 83 includes a clamp 84 having arms which hold the damper 80. The clamp 84 is secured by means of a screw 85 which passes into the clamp and locks the clamp into position onto the damper 80. The dampner 80 is free to pivot. As the ball moves along the lever 73, the movement of the ball, pushes the damper in an upward direction about its pivot point. Moving the adjustable weight towards the damper pivot pin 82 produces more dampning by applying more force onto the steel ball and requiring a greater amount of oscillation to move the ball against the damper 80. Locating the adjustable weight further along the damper 80 and closer to its pivot point requires less force from the steel ball to push the damper upward. Therefore, the sensor will be more sensitive to oscillations and more brake force will be applied.

As was heretofore mentioned, a knob 23 is provided on front of the sensor to adjust its sensitivity to oscillations thereby applying more brake force. Referring now to FIGS. 8 and 9 there can be seen that the platform 37 is of general square shape having various sized recessed portions 40, 41, 43 of progressively deeper shape along each of the sides with the fourth side 38 having no recessed portion at all. Extending from one surface of the platform is an axle 86. Extending from the other surface thereof is a cylindrical member 87 having a center bore 88 and orthogonal grooves 89 extending from the center bore 88 through the cylinder surface to the outer wall thereof. A mating section connected onto the printed circuit board 10 comprises a cylinder 90 of approximately the same circumference as cylinder 87 and including an axle 91 extending therefrom and colinear therewith. The axle 91 is of a circumference such that it will fit within the bore 88 of the cylinder 87. Orthogonal ribs 92 extend from the cylinder 90 such that they will fit within the orthogonal grooves 89 in the platform section. A knob retaining screw 93 passes through the outside of the knob 23 into the axle 86 securing the platform to the knob. A platform lock spring 94 is held in compression between a protruding section 95 on the front of the casing 11 and the platform 37 which is normally spaced from the inner surface of the casing 11. The knob 23 is shaped to snugly fit over the protruding section 95.

When assembled, the axle 91 fits into the bore 88 and the orthogonal ribs 92 fit into the orthogonal grooves 89. When the knob is grabbed within the fingers of the user the knob can be pulled outwardly further compressing the spring 94 and pulling the platform 37 into an abutting relationship with the inner surface of the casing 11. Although the axle 91 still remains partly within the bore 88, the orthogonal ribs 92 are then spaced from the orthogonal grooves 89 and the knob 23 can be rotated clockwise or counter-clockwise. When the knob 23 is rotated by 90° and then released, the ribs 92 will again fit within the orthogonal grooves 89 but will now be 90° turned with relation to its initial position. In this manner a different side of the platform with a different recess will be placed under the steel ball. The deeper the recess, the more the steel ball will be held into its rest position and the greater the oscillating force on the trailer which will be needed to move the steel ball from its rest position. The flat side 38 of the platform will provide the most sensitivity since very little oscillating force will be needed to move the steel ball from its rest position.

The control knob 23 therefore provides coarse adjustment for the sensitivity of the sensor. To change the setting, the knob 23 is pulled out slightly and turned in either direction a slight amount. The knob is then released and the turning continued until the knob snaps in and locks in position wherein the ribs 92 fit within the orthogonal grooves 89. Numbers placed on the knob are so arranged that the higher number gives more sensitivity and thus more active braking.

A further adjustment is provided utilizing the slide 24 on top of the casing 11 which controls a magnetic biasing arrangement holding the steel ball in place. The steel ball 145 being of magnetic material, can be held by means of a magnetic field produced by a permanent magnet. The closer the magnetic field is to the steel ball the more retention the field will have upon the steel ball. As the magnet is moved further away from the steel ball, the less force there is to retain the steel ball in its rest position. As seen in FIGS. 1, 2, 5 and 7 a magnet 100 is contained on the rear of the printed circuit board and is held on a platform 101 which in turn is held within a first slide retainer 102 having a slot 103 therein permitting the magnet 100 to slide in a vertical direction. An upper spring retainer 104 is carried within a transverse yoke formed in the slide retainer 102. An inclined slot 105 is formed within the upper spring retainer 104. The upper spring retainer 104 has the slide 24 connected thereto such that as the slide moves to the left or right the upper spring retainer 104 will slide within the yoke of the slide retainer 102. The upper spring retainer 104 is held by slide tension springs 106 to a spring bar 107 which is securably fastened to the slide retainer 102. The slide retainer 102 is securably mounted onto the rear of the printed circuit board 10.

As the slide 24 is moved to the left or the right and the upper spring retainer 104 is caused to move horizontally, the inclined slot 105 will cause the magnet 101 to move in a vertical direction within the slot 103. The front of the slide 24 has a notched lip 26 which faces the front of the sensor casing 11 and fits over numbered ribs on a slide index plate 25. The slide 24 can be lifted thereby lifting slide tension springs 106 to permit the notched lip 26 to be lifted off one of the ribs and slid onto the next rib. When released, the slide tension springs 106 will hold the notched lip securely onto the next rib.

The top slide 24 provides a fine adjustment of sensitivity. As the notched lip 26 is moved onto higher numbered ribs, the magnet is caused to move upwardly away from the steel ball and thereby provides less magnetic retaining force onto the steel ball. Greater sensitivity then results and less trailer oscillation is needed before the brakes are applied.

Figure 2:
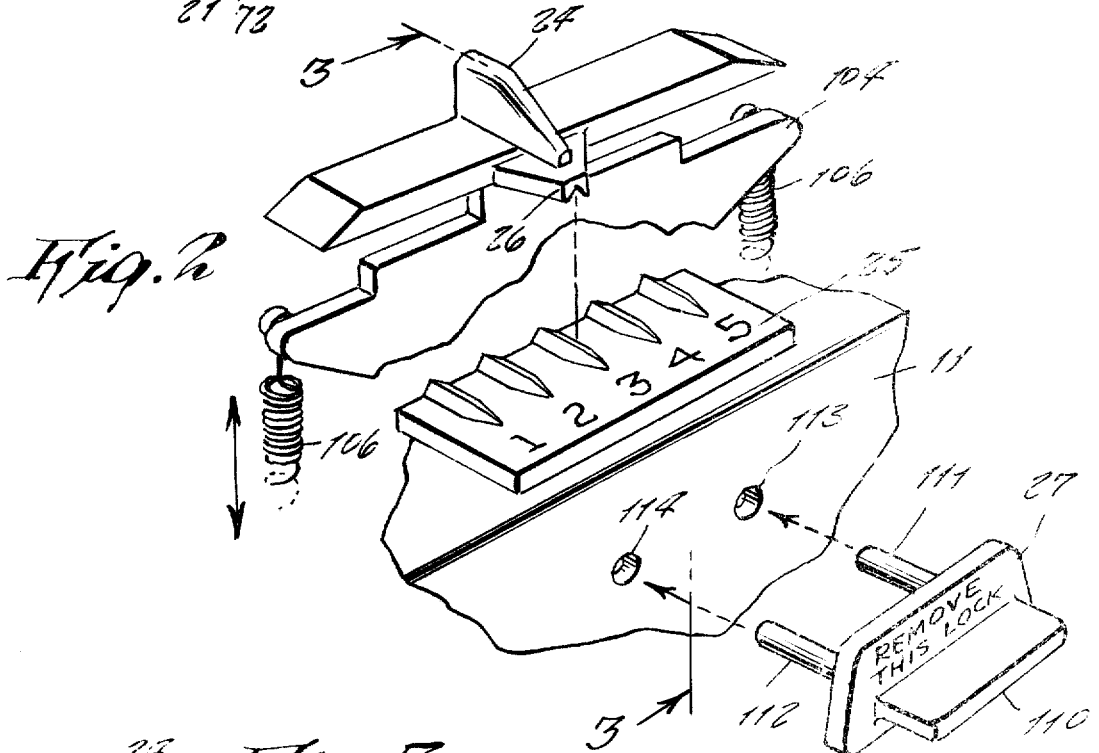
FIG. 2 is an exploded fragmentary isometric view of the magnetic biasing slide control and the ball shipping lock.
Figure 3:
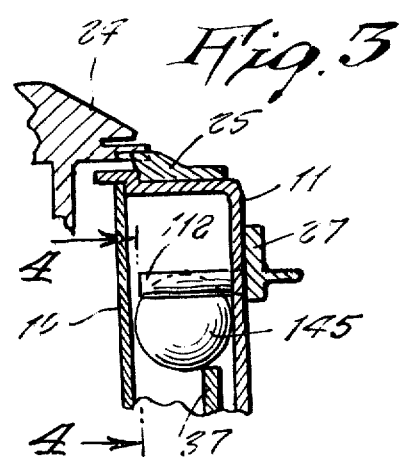
FIG. 3 is a fragmentary cross sectional view taken along line 3—3 of FIG. 2.
Figure 4:
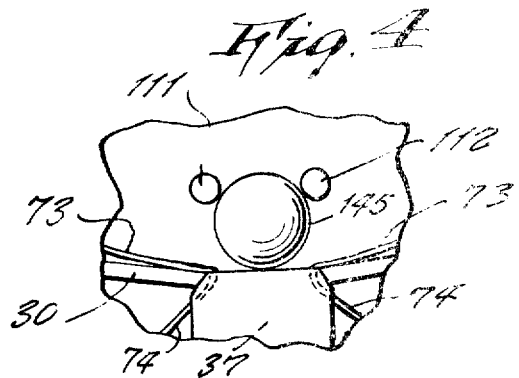
FIG. 4 is an elevational view of the ball shipping lock retaining the ball in fixed position and taken along line 4—4 of FIG. 3.

Referring now to FIGS. 2, 3, and 4 there is shown the ball lock 37 provided with a front lip 110 which permits its easy removal. On the backside of the ball lock are two pegs 111, 112 which are arranged to fit into two spaced apart holes 113, 114 in the front wall of the casing 11. The holes 113, 114 are located adjacent and on either side of the steel ball when in a resting position. When the ball lock 27 is inserted, the pegs 111, 112 retain the steel ball and prevent it from moving onto the control bar lever 73. The ball lock 27 is used during transporting of the sensing device. The ball lock must then be removed and preferably the two holes 113, 114 covered with a dustproof cover when the sensing device is in use. The ball lock 27 can be retained such that at any time the sensor can be deactivated when the user does not have a trailer connected to the towing vehicle. By inserting the ball lock when the steel ball is in its rest position, the steel ball is once again trapped and the sensing device is deactivated.

Figure 10:
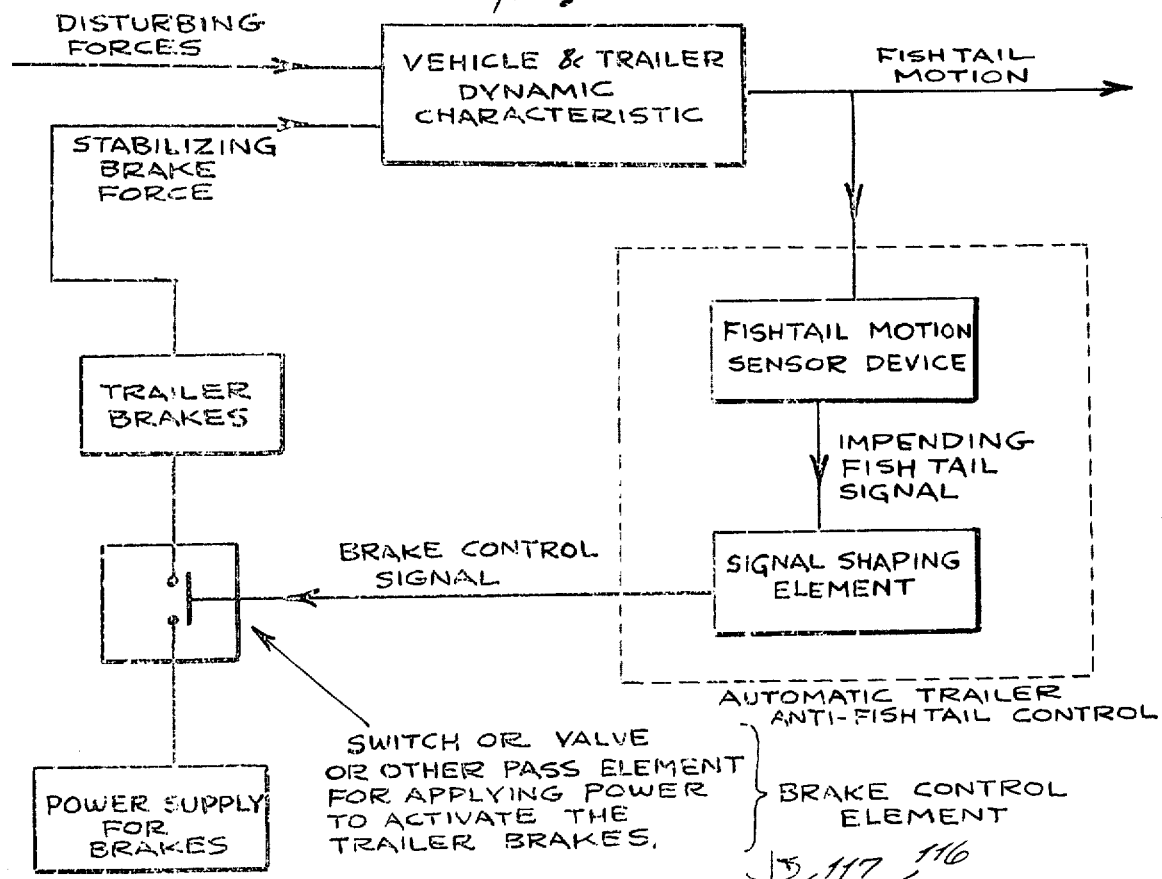
FIG. 10 is a schematic block diagram of the brake control system in which the sensing device of the present invention can be utilized.
Figure 19:
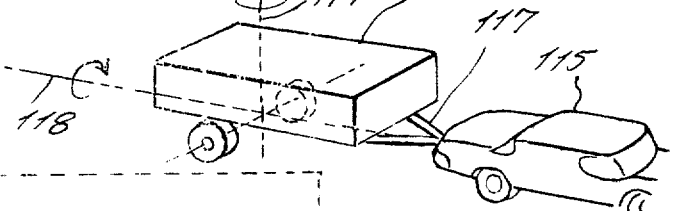
FIG. 19 is a diagrammatic view of a towed vehicle and a towing vehicle shown illustratively as flat storage unit hitched to the rear of a passenger automobile and indicates the possible oscillations serving as the disturbing forces which can be sensed by the sensing device of the present invention.

The operation of the sensing device in conjunction with an automatic brake control system can best be described with regard to FIGS. 10 and 19. In FIG. 19 there is shown a towing vehicle 115 to which there is connected a towed vehicle 116 by way of example being shown as a flat storage trailer. The towed vehicle is connected to the towing vehicle by means of a hitch type connection 117. During the course of travel, the towed vehicle 116 will tend to oscillate either about a vertical axis 117 causing movement of the rear portion of the trailer to the left or to the right. This is commonly known as fishtailing. In addition, the trailer may also oscillate about a logitudinal axis 118 which can also cause a dangerous condition. Either of the oscillations will cause disturbing forces which will be transmitted to the rear of the towing vehicle 115 by way of the hitch 117. Both of these types of disturbing forces will include a component extending in a direction transverse to the direction of the movement of the vehicle. It is this transverse force which acts upon the steel ball and the sensing device and causes the sensing device to detect the extent of the oscillations by determining the extent of the force in the transverse direction.

As seen in FIG. 10 the disturbing forces act upon the vehicle and trailer. The amount of the disturbing forces necessary to move the trailer and vehicle depend upon dynamic characteristics of both the trailer portion and the vehicle portion. For example, the longer the trailer, the greater the oscillations resulting from even a small force. Also, the weight, the size of the tires, and various other factors relating to both the trailer and the vehicle will determine the amount of fishtail motion which will be produced by a disturbing force. The fishtail motion is detected by the sensor device which is an automatic trailer antifishtail control sensor of the type described in the present invention and shown within the dotted lines. The control includes apparatus for detecting the fishtail motion and producing an impending fishtail signal. The signal is properly shaped by a signal shaping element to produce a useful signal which can be applied to a brake. In most cases the brakes include a switch element or other similar valve or pass element which transfers the power from a power supply to activate the trailer brakes. The brake control signal from the signal shaping element is therefore applied to such switch thereby transferring the power to the trailer brakes to provide a stabilizing brake force which counteracts the disturbing forces producing the fishtail motion on the trailer and vehicle.

Figure 11:
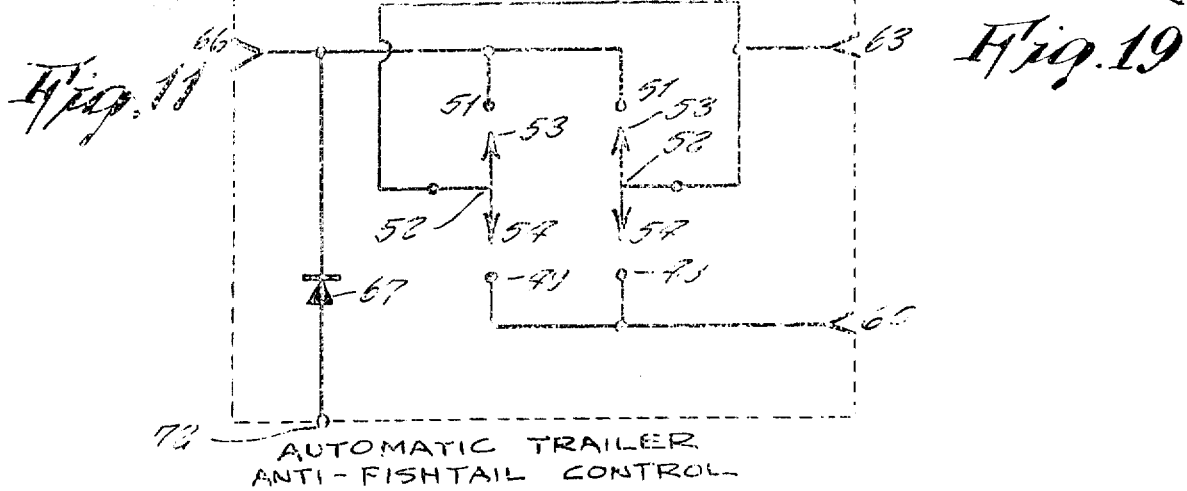
FIG. 11 is a schematic circuit diagram of the electrical configuration of the sensing device of the present invention.

Referring now to FIG. 11 the electrical equivalent of the sensing device heretofore described will now be explained. Reference numerals have been used on the electrical schematic which corresponds to the mechanical items heretofore described. Four output terminals are shown on the sensing device including terminal 66 which is to be connected to the brake circuit. Typically, the terminal will be connected to a solenoid (not shown) which is generally used with electrical brake systems to cause the brake shoes to expand in proportion to current flow thereby providing effective braking action. The diode 67 is connected to be in parallel with the solenoid in order to supress voltage spikes produced by the collapsing magnetic field in the solenoid. The diode ends in terminal 72 which is to be connected to ground.

Terminal 63 is to provide the DC voltage input from the car battery, and terminal 60 is to be connected to a warning light which can typically be placed on the accessory panel in front of the driver. The double pole switches have the switch portions 52 which can close contact 53 onto contact 51 thereby sending the current through the terminal 66 which will energize the solenoid to activate the brakes. The switch 52 can also cause contact 54 to close onto contact 49 thereby sending the current from the battery to the terminal 60 thereby energizing the warning signal. The determination of whether a warning signal or a brake signal will be produced is dependent upon the extent of the oscillations.

Preliminary or initial adjustment of the sensing device to place it into service is readily carried out. First, the unit must be properly placed in the rear portion of the car or the front portion of the trailer. The sensor should be adjusted properly. If the sensor is lower on one side, braking will be too active for turns in the opposite direction. The sensor should be parallel to the road surface. If one of the car springs is weak, the sensor must be raised on the low side. The sensor should be kept as close to the rear of the vehicle as possible with the knob facing forward or towards the rear. The sensor should be mounted so that the ball 145 rolls parallel to the axis of the wheels of the car or trailer. Too active braking for turns or swings in one direction, with inactive braking in the opposite direction, will result if the sensor is not carefully set up. In many cases the sensor may be mounted directly on the rear trunk wall of the vehicle. The sensor should be in a vertical plane with the vehicle resting on level ground. Final adjustment should preferably be made with the trailer attached.

With the unit now mounted in place, the terminals should be properly connected to the DC voltage of the vehicle, the brakes of the trailer, a warning lamp and a ground connection. Adjustment can now be made for proper and adequate operation of the sensing device. For normal operation the knob should be set at approximately number three and the top slide to number four. By actual road test it can then be determined if these positions would be suitable for the particular vehicle and trailer being used. If the brakes are energized too quickly and too much braking action is noted the knob and the slide can be adjusted to reduce the braking action. First, the knob is used to provide coarse adjustment and subsequently the slide is used to provide fine adjustment. Usually, a satisfactory adjustment is one which will result in providing a brake signal only when the vehicle negotiates a corner of a 40 foot radius at about 15 miles per hour. Being linear, curves of a larger radius can then be negotiated at normal speed without brake application. Should it not be possible to obtain sufficient adjustment of the device using the externally available knob and slide combination, the sensing device can be opened and the dampners readjusted to provide additional flexibility in setting the adjustment.

Once the control unit has been adjusted for normal service, the towing vehicle with the towed trailer connected to it is operated in the usual way. So long as lateral acceleration of the trailer is less than that required to cause displacement of the ball 145 relative to its rest position on platform 37, the sensing device remains inactive. When the ball 145 does leave its rest position, a warning light is energized. If the operator is satisfied that the sensitivity adjustment is correct, then flashing of the warning light may indicate that the speed is too great for the road being negotiated and prevailing wind conditions. Reduction of the speed to no more than that at which the warning light remains off avoids the possibility of a more dangerous condition such as would occur upon an increase in the curvature of the roadway or a rise in the wind velocity. In the absence of excessive speed, flashing of the warning light may be the result of the trailer being unevenly loaded with too much of the loads toward its rear. A tire going soft can also result in flashing of the warning light as can also an unbalanced or otherwise defective hitch between the trailer and the towing vehicle. Thus, the sensing device greatly facilitates early detection of unsafe conditions.

When the force generated by lateral acceleration of the trailer is not only great enough to overcome the restraining effect of the bias magnet 100 and the platform groove to permit energization of the warning lamp, but also enough to result in sufficient displacement of the ball 145 along one of the levers 73 to counterbalance it and raise the free end of the switch pole 52 connected thereto, then the circuit to the warning lamp is opened, and continued upward movement of the pole 52 serves to close the brake energizing circuit and the trailer brakes are energized for as long as the circuit remains closed. If desired, a further parallel circuit (not shown) controlled by pole 52 and upper switch leaf 50 can be provided so that the warning lamp is also energized when the brakes are actuated. The operation of the system to energize the trailer brakes is much faster than that of even the most highly skilled operators and, by forcing the rear of the trailer back into line behind the towing vehicle, ensures rapid damping of any tendency to oscillate. A further effect of the sudden application of the trailer brakes and consequent rapid lateral deceleration is to cause a relatively rapid displacement of the ball 145 from the side it was on toward the opposite side usually with sufficient force to keep the ball from being retained on platform 37 so that the switch on the opposite ramp assembly is actuated to energize the trailer brakes once again. This action may be repeated several times until substantial lateral motion of the trailer is eliminated.

In addition to being fast acting, the control system provides a long useful, trouble-free life in operation. In this connection, it is also to be noted that the operation of each of the switch poles 52 by means of the lever 74 connected thereto, as was described hereinabove, provides a positive wiping action between its contacts and the upper and lower contacts 51 and 49 that ensures proper switch action throughout a long useful life.

A further embodiment of this invention is described in connection with FIGS. 12, 13, 14 and 17. This embodiment comprises two balls 120, 121. The remaining items are essentially identical to that described with respect to the first embodiment and accordingly are numbered identically. By using two balls, oscillation in either direction will immediately be detected and a faster response can be provided. The reason for this is that instead of one ball which must traverse the control bar lever 73 in both directions, the second ball of present embodiment is in position to traverse the lever on one side while the other ball traverses the lever on the other side. Thus, assuming ball 121 to be in its stationary position on platform 137 and ball 120 to be approaching the upper end of the left lever bar control 78, as the rear of the trailer is subjected to a substantial wind which causes the trailer to swing to the left, both balls will undergo an apparent acceleration to the right as viewed by an observer riding in the vehicle and facing to the rear. Although the ball 120 will be descending its lever bar control 73, the ball 121 is immediately propelled up its ramp member to the right whereby the time interval between brake pulses is reduced. This is particularly desirable in the case of large trailers carrying a heavy cargo at high speed.

When using the embodiments shown in these figures, it is necessary to use a platform 137 which has notches 138, 139, 140 which are substantially longer than the notches heretofore described with regard to the first embodiment. This is because the notches must retain both of the balls. It may even be necessary to increase the size of the platform to accomodate both of the steel balls.

When using the two balls as is described in this embodiment, a magnet as shown in FIG. 14 can be used.

Referring now to FIG. 16 a further embodiment is shown again utilizing two steel balls 120, 121 and including a ball separator 143 therebetween. In this manner, each of the balls can only ascend one ramp assembly and is prevented from moving to the opposite side. Therefore, while steel ball 120 is moving, the other ball 121 will be held back such that the steel ball 121 will already be in a position to ascend the lever 73 in the opposite direction. This provides further improvement in the speed of reaction of the sensing device.

When using the embodiment shown in FIG. 15 it is possible to have a magnet 144 of the type shown in FIG. 16 which has a split polarity such that one steel ball 121 would be adjacent to one polarity, for the example the south pole, while the other steel ball 120 would be adjacent to the other polarity, in the example assumed being the north pole.

While the present invention has been described in detail in connection with trailers having electrically actuated brakes, it is equally applicable to trailers having other types of brakes. For example, in the case of a trailer having pneumatically actuated brakes, the upper contacts of the switches 144 are connected to control the energization of solenoid valves which in turn control the pneumatic brake as is well known.

In a similar manner while steel balls have described it will be understood that any type of ferromagnetic balls could be used without departing from the scope of the invention.

There has therefore been provided an acceleration sensing device for use in a trailer brake system which provides a warning signal when a limited amount of oscillations occur in the trailer and a brake signal when excessive amount of oscillations occur in the trailer.

There has been disclosed heretofore the best embodiment of the invention presently contemplated. However, it is to be understood that changes and modifications may be made thereto without departing from the spirit of the invention.

One such modification is that the towing vehicle might be a car, the tractor portion of a truck, or any other type of suitable towing vehicle and that the towed vehicle might be a boat trailer, a recreational pleasure trailer, a cargo trailer or any other type of towed vehicle.

What is claimed is:

1. An acceleration sensing device comprising an acceleration sensing body, holding means, housing means enclosing said holding means, all means supported thereon and said sensing body in operative relationship, platform means supported on said holding means and forming a rest position normally supporting said acceleration sensing body, first and second switch means supported by said holding means on opposite sides of said platform means, each switch means including two contact means and moveable pole means having a bi-directionally deflectable end portion for closing onto said contact means, lever means forming a predetermined path having two continuous branches each branch extending on opposite sides of said platform means, each branch commencing with a first section adjacent to said platform means having an upwardly inclined concave curved shape followed by a substantially horizontal second section and concluding in a linearally upwardly inclined third section terminating adjacent to the edge of said holding means, the commencing end of each branch being connected to said deflectable end portion of said switch means, said body being moveable along said lever means in response to an acceleration having a component extending along the direction of said path, means biasing said body to normally remain on said rest position so that a predetermined force resulting from the last mentioned acceleration component is required to displace said body, whereby as said body traverses along the lever means said moveable pole means is deflected in one direction to close onto a first one of said contact means as said body engages a first part of said first section and said moveable pole means is deflected in the other direction to close onto the other of said contact means as said body engages the rest of said lever means, and damping means providing a restraining force as said body traverses said lever means.

2. A device as in claim 1 and further including ramp means extending on opposite sides of said platform means spaced beneath said lever means and securably fastened onto said holding means, said first and second switch means being fastened onto said ramp means.

3. A device as in claim 2 and further comprising yoke means upwardly extending from the outer ends of said ramp means for providing a lower limit of movement for the terminating ends of the lever means when said lever means is engaged by said body.

4. A device as in claim 1 and wherein said platform means has approximately square sides with a front and back face and a recessed portion on at least one of its sides, said device further comprising means for rotating said platform means to have a different one of its sides serve as the rest position supporting said accelerating body.

5. A device as in claim 4 and wherein said platform means includes at least three progressively deeper recessed portions each respectively on a different one of its sides.

6. A device as in claim 4 and wherein said platform means includes shaft means axially extending from one face thereof and wherein said rotating means includes knob means located on the outside of said housing means and fastening means interconnecting said knob means with said shaft means such that rotating said knob means correspondingly rotates said platform means.

7. A device as in claim 6 and wherein said platform means further includes cylinder means axially extending from the other face thereof, said cylinder means having an axial bore therethrough, and further including orthogonally arranged grooves on the outer surface thereof, said rotating means further including additional cylinder means securably connected on said holding means adjacent the commencing ends of said lever means, said additional cylinder means having orthogonally arranged ribs extending from the outer surface thereof, and concentric axle means extending therefrom, said axle means arranged to fit within the axial bore of the cylinder means and said orthogonal ribs arranged to fit within said orthogonal grooves.

8. A device as in claim 7 and further comprising compression spring means located about said cylinder shaft means for spacing said platform means from the inside of said housing means.

9. A device as in claim 1 and wherein said biasing means includes adjustment means to vary the amount of biasing on said body.

10. A device as in claim 9 and wherein said biasing means includes magnetic means.

11. A device as in claim 10 and wherein said adjustment means includes means for changing the position of said magnetic means relative to said body and slide means located on the outside of said housing means and connected to said means for changing the position of said magnetic means, such that operating the slide means changes the position of said magnetic means.

12. A device as in claim 11 and wherein said adjustment means further includes slide index plate means located on the outside of said housing means and having a plurality of position indicating ribs, and wherein said slide means includes notched lip means for fitting onto said rib means.

13. A device as in claim 11 and wherein said means for changing position includes first retaining means fastened onto said holding means and having a first passageway therein permitting said magnetic means to move therein in a first direction, and second retaining means having a second passageway angularly related to said first passageway and slidably coupled to said first retaining means such that it can slide in a direction perpendicular to said first direction, said slide means being connected to said second retaining means and said magnetic means being moveably retained within both said first and second passageways.

14. A device as in claim 13 and further comprising bar means fixedly connected to said first retaining means and tension spring means interconnecting said second retaining means to said bar means.

15. A device as in claim 1 and wherein said holding means contains on one side thereof a plurality of contact areas, one of said two contact means being interconnected to a first contact area, the other of said contact means being interconnected to a second contact area, and said moveable pole means being interconnected to a third contact area.

16. A device as in claim 15 and further comprising diode means interconnected between said second contact area and a fourth contact area.

17. A device as in claim 16 and wherein said first contact area is electrically connected to a first terminal pin interconnected to a warning device, said second contact area is electrically interconnected to a second terminal pin connected to a brake solenoid device, said third contact area is electrically interconnected to a third terminal pin connected to a voltage source and said fourth contact area is electrically connected to a fourth terminal pin connected to a ground terminal.

18. A device as in claim 17 and wherein said first and third terminal pins and said second and fourth terminal pins are respectively related to form two twopronged male plugs.

19. A device as in claim 18 and wherein each of said male plugs are externally available on the outside of said housing means.

20. A device as in claim 1 and further comprising ball lock means for retaining said body means on its rest position.

21. A device as in claim 20 and wherein said housing means includes two spaced apart holes located adjacent to and above said body means and wherein said ball lock means includes means having prongs insertable into said holes.

22. A device as in claim 1 and wherein said damping means includes first and second arms in pivoted arrangement with said holding means at the outer ends thereof, and being inclined upwardly to approach each other such that their inner ends are terminated in spaced apart relationship above said body means when said body means is in a resting position.

23. A device as in claim 22 and where said dampening means further includes adjustably sliding weight means on each of said first and second arms.

24. A device as in claim 23 wherein said first and second arms have at least a portion far from the pivoted ends thereof bifurcated to permit said lever means to pass therethrough.

25. A device as in claim 1 and further comprising a second acceleration sensing body means wherein both of said body means are located adjacent to each other and share said platform means.

26. A device as in claim 25 and further comprising separating means connected to said holding means and separating said two bodies.

27. A device as in claim 26 and wherein said biasing means is a magnet having a first polarity adjacent to one of said body means and a second polarity adjacent to the other of said body means.

28. A device as in claim 1 and wherein said acceleration sensing body is a steel ball.

29. A device as in claim 1 and wherein said holding means is a printed circuit board.

30. In an automatic brake system for a vehicle having a trailer portion and including a control circuit for providing a warning signal in response to a warning output and a brake signal in response to a brake output, an acceleration sensing device for producing said warning output and said brake output comprising an accelerating sensing body, housing means enclosing holding means, all means supported thereon and said sensing body in operative relationship, board means, platform means supported by said board means and forming a rest position normally supporting said acceleration sensing body, first and second switch means supported by said board means on opposite sides of said platform means, each including two contacts as moveable pole means having a bi-directionally deflectable end portion for closing said contacts, lever means forming a predetermined path having two continuous branches each branch extending on opposite sides of said platform means, each branch commencing with a first section adjacent to said platform means having an upwardly inclined concave curved shape followed by a substantially horizontal second section and concluding in a linearally upwardly inclined third section terminating adjacent to the edge of said board means, the commencing end of each branch being connected to said deflectable end portion of said switch means, said body being moveable along said lever means in response to an acceleration having a component extending along the direction of said path, means biasing said body to normally remain on said rest position so that a predetermined force resulting from the last mentioned acceleration component is required to displace said body, whereby as said body traverses along the lever means said moveable pole means is deflected in one direction to close a first one of said contacts as said body engages a first part of said first section in rsponse to limited oscillation of said trailer portion thereby providing a warning output, and said moveable pole means is deflected in the other direction to close the other of said contacts as said body engages the rest of said lever means in response to excessive oscillations of said trailer portion thereby providing a brake output, and damping means providing a restraining force as said body traverses said lever means.

* * * * *